128,346

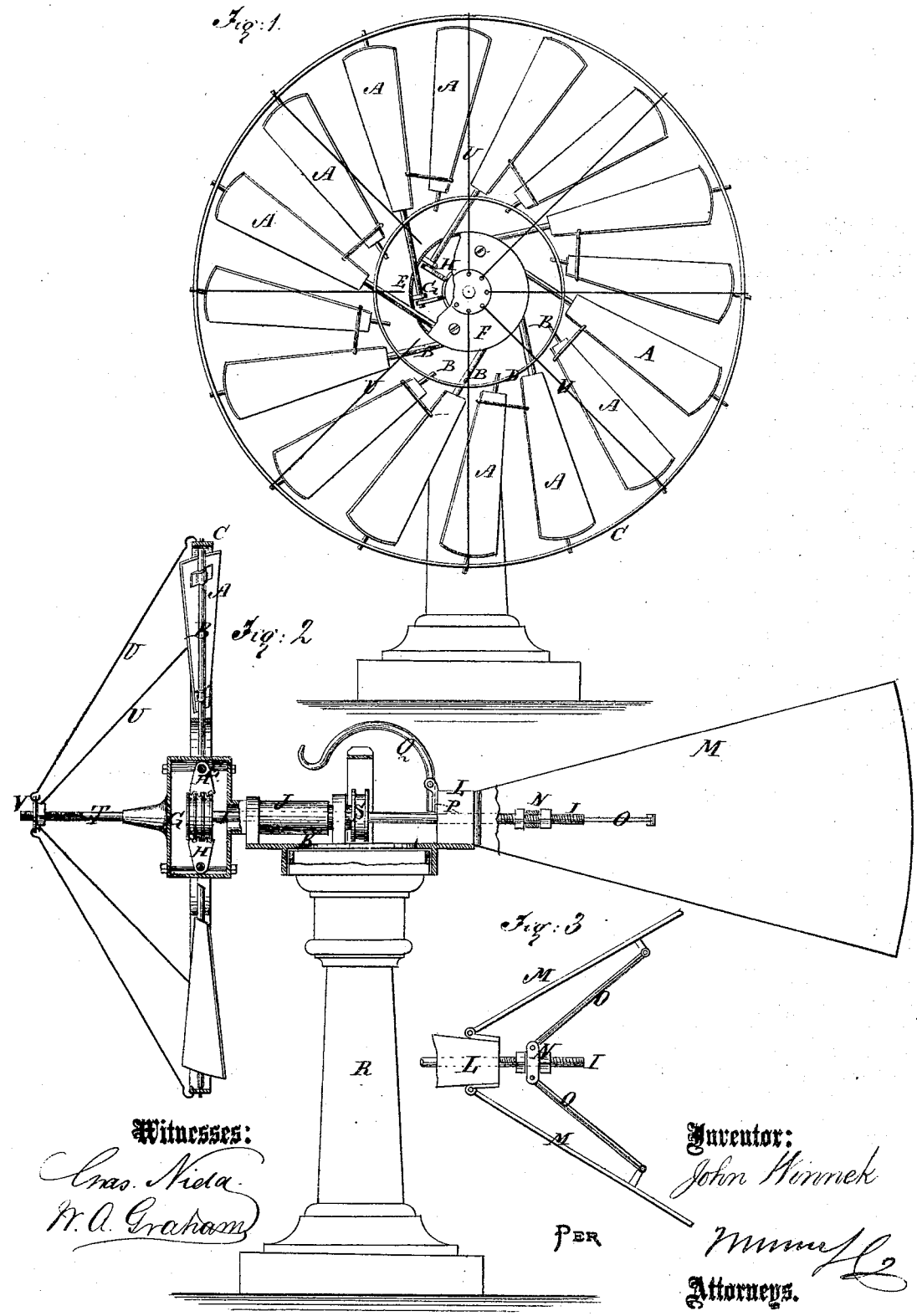

UNITED STATES PATENT OFFICE.

JOHN WINNEK, OF LAKE MILLS, WISCONSIN.

IMPROVEMENT IN WIND-WHEELS.

Specification forming part of Letters Patent No. 128,346, dated June 25, 1872.

Specification describing a new and useful Improvement in Windmills, invented by JOHN WINNEK, of Lake Mills, in the county of Jefferson and State of Wisconsin.

My invention consists of a vertically-revolving wheel on a horizontal axis, with vanes or blades on the spokes, which are pivoted at the periphery and near the center to turn on their own axes. The said spokes are arranged tangentially to a circle considerably larger than a grooved hub at the center, and they have segmental toothed arms at right angles to them, on the inner ends, gearing with said hub, which is connected to a rod extending through the hollow shaft to and connected with the two fans of the tail, jointed to the turn-table, and arranged in the form of two sides of a triangle to receive the wind obliquely on their sides and be forced together when the wind is strong and by their movements turn the blades of the wheel to take less wind, and when the wind is slack to turn them the other way, said vanes being moved outward by a weight or spring.

Figure 1 is a front elevation of the wheel with part of the hollow hub broken out. Fig. 2 is a horizontal section through the wheel, turn-table, and one of the vanes of the tail; and Fig. 3 is a plan of a portion of the tail.

Similar letters of reference indicate corresponding parts.

A represents the vanes or blades of the wheel. They are mounted on the spokes B, and the latter are journaled in the rims C and D to oscillate on their axes, and some of them—say every alternate one—pass beyond the rim D, through the rim E of a hollow hub, F, tangentially, to a circle a little smaller than the rim D, but considerably larger than the grooved hub G, and have toothed arms H attached to them at right angles or thereabout, and gearing with said hub, which is attached to a long rod, I, extending rearward through the hollow shaft J, across the center of the turn-table, K, through a block, L, at the side thereof opposite the wheel, and some distance beyond, and between the vanes M, which are hinged to the block L, as shown, and extending therefrom rearward in the manner of the two sides of an isosceles triangle whose apex is in said block L, for the wind to act upon them obliquely to keep the wheel pointing to windward; and said rod is connected to said vanes by the adjustable collar N and jointed rods O. Said rod I has a stud, P, against which the short arm of a bent lever, Q, bears in the direction to push it backward or rearward to keep the vanes open or separated from each other, and a weight or spring is to be attached to the long arm of this lever to maintain the vanes in this position against the wind, which tends to close them, and, through the medium of the grooved collar G and the arms H, said weight or spring acting on the rod I, also keeps the blades A of the wheel spread to the wind; but as the force increases the vanes M will be closed by it and the blades shifted to present less surface thereto. The hollow shaft or hub J, which revolves with the wheel, transmits motion through the hollow stand R to the apparatus below, by means of an eccentric, S, or any other suitable or approved means. A rod, T, extends forward from the front end of the hub F for the connection of brace-rods U for the wheel, which are connected to the rim C and to an adjustable collar or disk, V, on the said rod T. These braces are strained by shifting the collar or disk from the wheel, and slackened by shifting it the other way.

The effect of the vanes M on the blades A may be varied by shifting the connecting-collar for the rods O forward or back on rod T. The blades A, not extending through or into hub F, are connected to the others, to be shifted by them.

Having thus described my invention, I claim as new and desire to secure by Letters Patent—

1. The combination of the oscillating blades A, adjustable tail-vanes M, a weighted or spring-actuated lever and connecting mechanism, substantially in the manner herein described, for automatically shifting the blades as the force of the wind on the vanes changes, substantially as specified.

2. The arrangement of the spokes B or shafts of blades A, hollow hub F, grooved hub G, and the toothed arms H, substantially as specified.

3. The combination of the rod T, adjustable disk V, and rods U with the hub and rim of the wheel, substantially as specified.

4. The tail-vanes M, hinged to the turn-table on the side of its axis opposite the wheel, and connected to the rod I for adjustment by rods O, and an adjustable collar, N, substantially as specified.

5. The combination of hollow shaft J and long rod I passing through the hollow shaft J, connecting with grooved hub G in hollow hub F, and toothed arms H geared into grooved hub G, substantially as specified.

JOHN WINNEK.

Witnesses:
W. D. HOORD,
H. T. PLUMB.